United States Patent Office 3,567,381
Patented Mar. 2, 1971

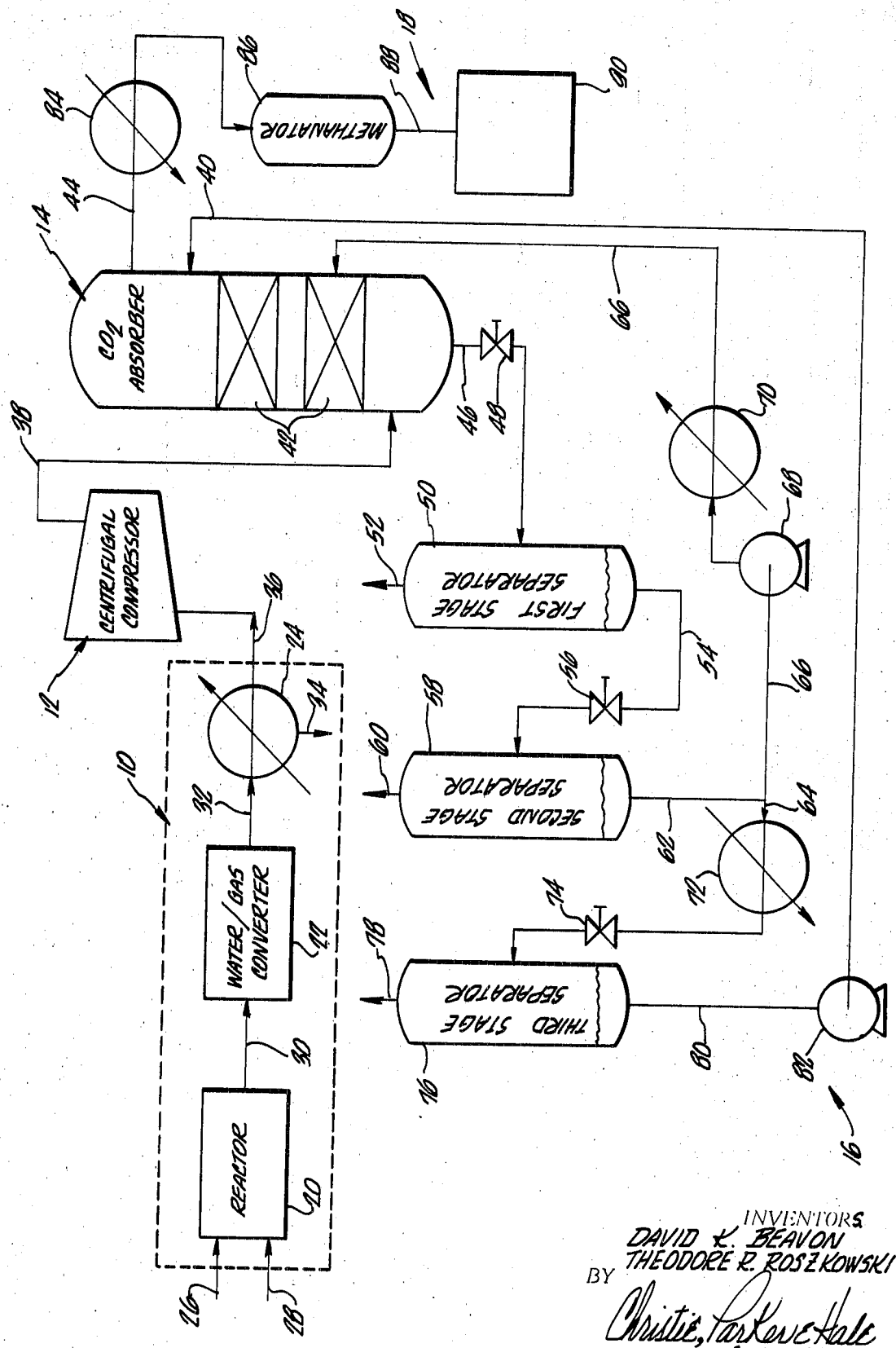

3,567,381
METHOD OF HYDROGEN MANUFACTURE
David K. Beavon, Long Beach, and Theodore R. Roszkowski, Malibu, Calif., assignors to The Ralph M. Parsons Company, Los Angeles, Calif.
Filed Sept. 22, 1967, Ser. No. 669,951
Int. Cl. C01b 1/16
U.S. Cl. 23—212
7 Claims

ABSTRACT OF THE DISCLOSURE

A hydrocarbon feed material is converted to a stream of hydrogen and carbon dioxide. The stream is compressed by centrifugal compression to a separation pressure and introduced into a carbon dioxide absorber. The carbon dioxide absorber employs a physical solvent to strip carbon dioxide from the compressed stream. The solvent is reclaimed by removing the solvent and solute carbon dioxide from the carbon dioxide absorber and passing it through successive stages of pressure reduction. In each stage of pressure reduction carbon dioxide comes out of solution and is separated from its solvent. The reclaimed solvent is recycled to the carbon dioxide absorber for reuse in stripping carbon dioxide from hydrogen.

BACKGROUND OF THE INVENTION

This invention relates to the art of hydrogen manufacture and, in particular, to an improved method for producing hydrogen and compressing it to an end use pressure.

Hydrogen is used in the production of such products as ammonia and in hydrocracker reactor systems which convert a heavy feed material in the presence of hydrogen to a lower molecular weight product. The hydrogen required in such processes is produced at the production plant at pressures which are normally far below that required for its end use.

One conventional process for obtaining hydrogen begins by a reaction of methane with steam in a steam-methane reforming furnace to produce a stream which includes carbon dioxide, carbon monoxide and hydrogen. One or more water-gas shifts convert the carbon monoxide into more carbon dioxide and hydrogen. The stream, after the water-gas reaction, is cooled to condense and separate its contained steam and scrubbed to remove most of the carbon dioxide. The remaining small quantities of carbon monoxide and carbon dioxide may be catalytically converted to methane. The resulting high purity hydrogen is compressed from its production pressure, typically 200 to 500 p.s.i.g., to its end use pressure. The end use pressure of the hydrogen is up to 3500 p.s.i.g. and typically between 1500 and 3000 p.s.i.g. for hydrocracking use and from 2000 to 10,000 p.s.i.g. for ammonia production.

In the conventional conversion process of methane to hydrogen, carbon dioxide is removed at a pressure essentially the same as the pressure in the steam-methane reforming furnace. This pressure is normally limited to between 200 and 500 p.s.i.g. Carbon dioxide extraction takes place within this range of pressure and is conventionally done with such solvents as monoethanolamine or a solution of potassium carbonate. The solvents employed react chemically with the carbon dioxide to form a chemical compound which is separated from the hydrogen. The separated chemical compound is dissociated by steam stripping to regenerate the solvent for reuse in purifying hydrogen.

This method for generating hydrogen often requires the compression of the purified hydrogen to an end use pressure considerably in excess of its production pressure. Purified hydrogen, however, has a low molecular weight which limits the choice of compressors to be used to reciprocating compressors. At least in large volume plants typically associated with hydrocrackers and ammonia production, centrifugal compressors would be considerably more economical and reliable than reciprocating compressors. Centrifugal compressors, however, cannot be effectively employed to compress purified hydrogen to end use pressure because of the number of compressor stages required to handle relatively large volumes of hydrogen.

The production of purified hydrogen and its compression to an end use pressure described with reference to steam-methane reformation is also applicable to other methods of producing hydrogen. Initially, the steam-methane process is not limited to natural gas but can include the conversion of light paraffin hydrocarbons such as propane or naphtha. Hydrogen may also be produced by partial oxidation of hydrocarbons. All these methods produce carbon dioxide with the hydrogen which is removed prior to the hydrogen's compression to end use pressure thus limiting the compressor choice to reciprocating compressors.

SUMMARY OF THE INVENTION

The invention provides a process for producing hydrogen which enables the use of centrifugal compression.

In one form, the process of the invention contemplates the conversion of a hydrocarbon feed material to a stream of hydrogen and carbon dioxide by a method which includes a water-gas shift. The hydrogen and carbon dioxide stream may be produced, for example, by steam reforming of methane or light paraffin hydrocarbons such as propane and naphtha. Partial oxidation of the hydrocarbon feed material may also be employed to obtain the stream of hydrogen and carbon dioxide. The resultant stream of carbon dioxide and hydrogen is compressed in at least one centrifugal compressor from essentially its production pressure to an elevated separation pressure prior to the removal of the carbon dioxide. The compressed stream is introduced into a carbon dioxide separator at the separation pressure where substantially all the carbon dioxide is removed from the hydrogen. The purified hydrogen may then be employed in the production of ammonia or in a hydrocracker reactor plant. The purified hydrogen may also be taken off as product.

Preferably, the carbon dioxide is removed from the hydrogen by a physical solvent. The solvent employed is one which has a high solvency for carbon dioxide at the elevated separation pressure but which will release carbon dioxide at reduced solvent and solute pressures to recover the solvent. Satisfactory physical solvents include water, n-methyl-2-pyrrolidone and sulfolane. The solvent and its carbon dioxide solute are preferably passed through successive stages of pressure reduction to reclaim the solvent. At each stage, carbon dioxide is released from solution and separated from the solvent. After the last stage of solvent purification, which may be at atmospheric or subatmospheric pressures, the reclaimed solvent is recycled to the carbon dioxide absorber. Preferably, a heater is employed in the solvent, carbon dioxide stream before the last pressure reduction stage to reduce the solubility of carbon dioxide by increasing the stream's temperature. A second recycle stream of solvent is preferably taken from the primary stream of carbon dioxide and solvent at an intermediate stage in the solvent reclamation portion of the process and introduced into the carbon dioxide absorber. The second recycle stream is taken from the primary stream before the latter is heated to reduce the amount of heat energy required to purify the solvent.

The amount of compression required of the centrifugal compressor employed in the process of the present invention is a function of the production pressure of the hydrogen and carbon dioxide stream as well as the absorber pressure and desired hydrogen end use pressure. Hydrogen end use pressures may be as low as 1500 p.s.i.g. when the end or destination use of the hydrogen is in a hydrocracker reactor plant. The practical upper limit of hydrocracker reactor plant pressure is about 3000 p.s.i.g. When used in hydrocracker reactor plants, the pressure of the stream of carbon dioxide and hydrogen after it leaves the centrifugal compressor will be essentially that of the plant. The carbon dioxide separator or absorber will also operate at this pressure. However, the centrifugal compression of the carbon dioxide and hydrogen stream also results in overall plant economies in ammonia synthesis. Typical ammonia plants operate at pressures of from about 2000 to about 10,000 p.s.i.g. In ammonia synthesis, the absorber or separation pressure may be lower than the hydrogen end use pressure requiring additional compression of the purified hydrogen stream after it leaves the separator.

In general, the centrifugal compressor is driven by the most economical form of energy available at the plant. Typically, electrical energy will be used. Additional economies can be effected, however, when the plant requires relatively low pressure steam as when steam-methane reformation is used to generate the carbon dioxide, hydrogen stream. In this case, steam is generated at a pressure substantially greater than the steam-methane reforming reaction pressure. This high pressure steam is used in a turbine which drives the centrifugal compressor and is exhausted from the turbine at a pressure suitable for use in the steam-methane reforming reaction.

As was previously mentioned, the hydrogen-carbon dioxide stream is produced by steam reformation of light hydrocarbons or by partial oxidation of such hydrocarbons. Typically, steam-methane reformation occurs at pressures in the range of from about 200 to about 500 p.s.i.g. Partial oxidation is usually accomplished at pressures of less than 600 p.s.i.g., but may attain pressures as high as 2000 p.s.i.g.

In either of the described methods of obtaining the carbon dioxide and hydrogen stream, a water-gas converter is used to convert carbon monoxide produced in the initial hydrogen production step to carbon dioxide and hydrogen. After the water-gas shift, the resulting stream is cooled to condense steam into water and the condensate removed prior to the stream's introduction into the centrifugal compressor.

After the production of relatively pure hydrogen, the hydrogen may be taken from the carbon dioxide absorber and further purified to remove the last traces of carbon dioxide and carbon monoxide. In this further purification it is preferred to employ a methanator to convert residual traces of carbon monoxide and carbon dioxide into methane and water. Another method of purification is by copper liquor scrubbing to remove the undesirable impurities. Still a further method of purification is by low temperature separation where the hydrogen stream is dramatically cooled to liquify the impurities. When a methanator is used to further purify the hydrogen stream leaving the carbon dioxide absorber, the stream is typically heated to a temperature of from 550 to 650° F. to effect proper catalytic action in the methanator.

The process of the present invention allows the use of centrifugal compressors in the production of hydrogen at elevated pressures. Centrifugal compressors offer enhanced reliability and economy over reciprocating type compressors as evidenced by the former's longer on-line operating time between overhauls. The compression of the hydrogen carbon dioxide stream before carbon dioxide separation is necessary for effective operation of a centrifugal compressor because this type of compressor requires a higher gas density than available with pure hydrogen. The additional energy required to compress the carbon dioxide before its removal does not affect the economy of a plant employing the process of the present invention because of the substantial economic advantages of using centrifugal compressors. In addition, the compression of carbon dioxide with its subsequent removal by a physical solvent further offsets the energy loss of compressing the carbon dioxide. This is so because the solvent is reclaimed without the addition of any substantial amount of energy. Previously, solvents were used which formed chemical compounds with the carbon dioxide which required dissociation of the resulting compound by heating or steam stripping for regeneration of the solvent. An energy saving is also produced by diverting a portion of the relatively purified solvent and solute stream before the final stage of reclamation. This reduces the amount of energy which may be required to heat the solvent and carbon dioxide to reduce the latter's solubility prior to the last reclamation stage.

These and other features, aspects and advantages of the present invention will become more apparent from the following description, appended claims and drawing.

BRIEF DESCRIPTION OF THE FIGURE

The single figure is a schematic flow diagram illustrating preferred processes of the present invention.

DESCRIPTION OF THE PREFERRED
EMBODIMENTS

The hydrogen generation system illustrated in the figure includes a hydrogen and carbon dioxide make-up circuit 10, a centrifugal compressor 12, a carbon dioxide absorber 14, a solvent reclamation circuit 16 and a hydrogen end use plant 18. In general, a hydrocarbon feed material is converted to hydrogen and carbon dioxide in circuit 10, compressed in centrifugal compressor 12 to a separation pressure and introduced into absorber 14 at the separation pressure. Absorber 14 effects the removal of carbon dioxide from hydrogen. The removal of carbon dioxide is effected by a physical solvent in absorber 14 with the solvent being reclaimed in circuit 16 by successive stages of pressure reduction which effects separation of carbon dioxide from solution. Purified hydrogen is taken from absorber 14 for its end use in plant 18.

Hydrogen and carbon dioxide make-up circuit 10 includes reactor 20, water-gas converter 22 and heat exchanger 24. Reactor 20 may, for example, be a steam-methane reformer or a partial oxidation reactor. In the case of steam-methane reformation, make-up stream 26 would be methane or light paraffin hydrocarbons such as naphtha and propane. For partial oxidation, make-up stream 26 consists of a suitable hydrocarbon feed material. A second stream 28 reacts with the constituents of feed stream 26 in reactor 20 to form hydrogen, carbon monoxide, carbon dioxide and water which are extracted as a stream 30. In the case of steam-methane reformation, stream 28 would be steam. In the case of partial oxidation, stream 28 is oxygen. Stream 30 enters water-gas converter 22 where one or more stages of water-gas shift takes place. With the water-gas shifts, carbon monoxide from stream 30 reacts with steam to produce carbon dioxide and hydrogen. A stream 32 which contains predominantly hydrogen, carbon dioxide and water with a minor amount of carbon monoxide leaves water-gas converter 22 and enters heat exchanger 24. Heater exchanger 24 cools stream 32 to condense its contained steam into water. The condensate from heat exchanger 24 is exited as a stream 34. Hydrogen and carbon dioxide pass as a stream from heat exchanger 24 into the inlet of centrifugal compressor 12 for its compression to carbon dioxide separation pressure.

The carbon dioxide and hydrogen compressed by centrifugal compressor 12 leave as a stream 38 for introduction into carbon dioxide absorber 14. Carbon dioxide absorber 14 employs a physical solvent to separate carbon dioxide from hydrogen. To effect this end, the gaseous stream of carbon dioxide and hydrogen is introduced into the bottom of absorber 14 and the physical solvent continuously circulated from a solvent stream 40 in countercurrent relationship through the rising carbon dioxide and hydrogen. Rachig rings or baffles 42 retain the solvent and produce intimate contact of the solvent with the rising carbon dioxide and hydrogen. The carbon dioxide goes into solution and as a solute with its solvent collects in the bottom of absorber 14. Purified hydrogen leaves as a stream 44 from absorber 14 for its end use.

As was just described, carbon dioxide absorber 14 employs physical solvents to absorb carbon dioxide. Satisfactory solvents include water, n-methyl-2-pyrrolidone and sulfolane. In any event, the solvent used will be one which has a high solvency for carbon dioxide at the elevated pressure existing in absorber 14 but a rather low solvency for carbon dioxide at lower pressures.

The solvent and its solute leave absorber 14 as a stream 46 and pass through a pressure reducing valve 48 into a first separator 50. The pressure within separator 50 is below the pressure existing in absorber 14. Inasmuch as the solubility of carbon dioxide in the solvent is directly proportional to the pressure of the solution, carbon dioxide will be separated in separator 50 from its solvent. The separated carbon dioxide leaves as a stream 52 from separator 50. The remaining carbon dioxide and solvent pass from separator 50 as a stream 54 through a pressure reduction valve 56 into a second stage separator 58. The pressure in separator 58 is lower than that in separator 50 and thus further purification of the solvent is accomplished. Separated carbon dioxide leaves separator 58 as a stream 60 while the relatively pure solvent leaves the separator as a stream 62. Stream 62 is divided into a first stream 64 and a second stream 66. Stream 66 is compressed in pump 68 to a pressure sufficient for its introduction into absorber 14. After pumping, stream 66 passes through cooler 70 for introduction as a recycle stream into absorber 14. The heat extracted in heat exchanger 70 of stream 66 may, of course, be used elsewhere in the system. The diversion of stream 62 into streams 64 and 66 effects an economy by reducing the amount of heat required to decrease the solubility of carbon dioxide and solvent in the last stage of solvent purification. Stream 64 passes into a heat exchanger 72 where the solvent and carbon dioxide are heated to decrease the solubility of carbon dioxide. Stream 64 passes from heat exchanger 72 through a pressure reducing valve 74 and into a third stage separator 76. Separator 76 is at a considerably lower pressure than the previous two separators, typically at atmospheric or subatmospheric pressures. Within separator 76 carbon dioxide passes out of solution from the solvent and is extracted as a stream 78. The purified solvent passes from separator 76 as a stream 80. Stream 80 is compressed to absorber or separation pressure by pump 82. The resultant purified and compressed stream passes as the solvent stream 40 into the upper portions of carbon dioxide absorber 14.

The relatively pure stream of hydrogen which leaves as a stream 44 from carbon dioxide absorber 14 may be taken off as product in ammonia synthesis or in a hydrocracker reactor plant. Depending upon its end use, it may be desirable to remove all traces of carbon monoxide and carbon dioxide from hydrogen stream 44. This is preferably done in a methanator, but low-pressure separation or scrubbing with copper liquor are alternate methods of purification. The figure illustrates purification in a methanator. Stream 44 enters and passes through heat exchanger 84 to raise its temperature, typically within the range of 550 to 650° F., for catalytic action in methanator 86. After its heating stream 44 passes into methanator 86 where methane and water are formed from the minor traces of carbon dioxide and carbon monoxide remaining in the stream. The purified hydrogen leaves methanator 86 as a stream 88 and then enters plant 90.

As was previously mentioned, plant 90 may be a hydrocracker reactor system, an ammonia synthesis plant, or any plant requiring hydrogen at elevated pressures. In any case, the pressure within plant 90 and the hydrogen production pressure in general determine the pressure across centrifugal compressor 12. In the case of hydrogen and carbon dioxide production by steam-methane reformation, the pressure of the carbon dioxide and hydrogen stream 36 at the inlet of centrifugal compressor 12 is typically 200 to 500 p.s.i.g. When plant 90 is a hydrocracker reactor system, the pressure at the outlet of the centrifugal compressor is typically from about 1500 to about 3000 p.s.i.g. When partial oxidation of a hydrocarbon feed material is used to produce the carbon dioxide and hydrogen stream, the stream pressure typically has an upper limit of 600 p.s.i.g. Ammonia synthesis is usually accomplished with pressures of from 2000 to 10,000 p.s.i.g. At the elevated pressures of ammonia synthesis it may be necessary to employ an additional compressor to compress the hydrogen to its end use or destination pressure because it may not be necessary or desirable to operate the carbon dioxide absorber at the distination pressure.

In the case where steam-methane reformation is used to generate the carbon dioxide and hydrogen stream, the economics of the process of the present invention can often be improved through the use of steam generated at a pressure substantially greater than the steam-methane reforming reaction pressure. This high-pressure steam is used in a turbine which drives the centrifugal compressor and is exhausted from the turbine at a pressure suitable for use in the steam-methane reforming reactions.

The present invention has been described with reference to certain preferred processes. The spirit and scope of the appended claims should not, however, necessarily be limited to the foregoing description.

What is claimed is:

1. An improvement in a process for obtaining hydrogen at elevated pressures of the type wherein a hydrocarbon feed material is converted to hydrogen by a method which includes a water-gas shift to produce a stream which includes primarily hydrogen and carbon dioxide with the stream having a relatively high average molecular weight compared to that of hydrogen, the improvement comprising the steps of:

(a) compressing the hydrogen and carbon dioxide stream in at least one centrifugal compressor from essentially the production pressure of the stream to an elevated separation pressure;
   (b) introducing, at the separation pressure, the compressed stream into a carbon dioxide separator containing a physical solvent having a high solvency for carbon dioxide at the separation pressure and an increasingly lower solvency for carbon dioxide at increasingly lower pressures;
   (c) separating substantially all of the carbon dioxide from the hydrogen in the separator to produce purified hydrogen at the separation pressure;
   (d) removing the physical solvent and dissolved carbon dioxide from the separator as a combined stream;
   (e) reducing the pressure of the combined stream to release carbon dioxide from the physical solvent;
   (f) separating the physical solvent from the released carbon dioxide at the reduced pressure as a recycle stream;
   (g) returning the recycle stream to the separator.

2. The process claimed in claim 1 wherein:
   (a) the pressure reduction step is accomplished in stages with carbon dioxide being released from solution at each stage;
   (b) the recycling step includes extracting a portion of relatively purified solvent from the carbon dioxide and solvent stream at an intermediate stage to form a second recycle stream; and (c) passing the second recycle stream into the separator.

3. The process claimed in claim 2 wherein the conversion of the hydrocarbon feed material which produces a stream of hydrogen and carbon dioxide includes steam reforming of the hydrocarbon feed material at a pressure of from about 200 to about 500 p.s.i.g. and the separation pressure is from about 1500 to about 3500 p.s.i.g.

4. The process claimed in claim 2 wherein the conversion of the hydrocarbon feed material which produces a stream of hydrogen and carbon dioxide includes partially oxidizing the hydrocarbon feed material and the separation pressure is from about 1500 to about 3500 p.s.i.g.

5. The process claimed in claim 2 wherein the final stage in the pressure reduction step is at about atmospheric pressure.

6. The process claimed in claim 2 wherein the solvent and carbon dioxide stream are heated after the second recycle stream is extracted to decrease the solubility of carbon dioxide in the solvent.

7. The process claimed in claim 1 wherein the physical solvent is n-methyl-2-pyrrolidone.

References Cited

UNITED STATES PATENTS

| | | | |
|---|---|---|---|
| 1,706,707 | 3/1929 | Reilly et al. | 23—210 |
| 3,103,411 | 9/1963 | Fuchs | 23—2 |
| 3,120,993 | 2/1964 | Thormann et al. | 23—2 |
| 3,347,621 | 10/1967 | Papadopoulos et al. | 23—210X |
| 3,382,045 | 5/1968 | Habermehl et al. | 23—213 |
| 3,383,838 | 5/1968 | Carson | 23—210 |
| 3,401,111 | 9/1968 | Jackson | 23—210X |
| 3,418,082 | 12/1968 | Ter Haar | 23—213 |
| 3,420,633 | 1/1969 | Lee | 23—210 |

EDWARD STERN, Primary Examiner

U.S. Cl. X.R.

23—150, 199, 213